(12) United States Patent
David et al.

(10) Patent No.: US 9,919,404 B2
(45) Date of Patent: Mar. 20, 2018

(54) METHOD FOR MACHINING MATERIALS BY MILLING AND SUBSEQUENT BRUSHING

(71) Applicant: Siemens Aktiengesellschaft, Munich (DE)

(72) Inventors: Walter David, Mulheim an der Ruhr (DE); Wolfram Knoche, Wesel (DE)

(73) Assignee: Siemens Aktiengesellschaft, Munich (DE)

( * ) Notice: Subject to any disclaimer, the term of this patent is extended or adjusted under 35 U.S.C. 154(b) by 552 days.

(21) Appl. No.: 14/415,589

(22) PCT Filed: Jul. 15, 2013

(86) PCT No.: PCT/EP2013/064902
§ 371 (c)(1),
(2) Date: Jan. 18, 2015

(87) PCT Pub. No.: WO2014/016154
PCT Pub. Date: Jan. 30, 2014

(65) Prior Publication Data
US 2015/0174728 A1 Jun. 25, 2015

(30) Foreign Application Priority Data

Jul. 27, 2012 (EP) .................................... 12178175

(51) Int. Cl.
*B24B 39/00* (2006.01)
*B24B 29/00* (2006.01)
(Continued)

(52) U.S. Cl.
CPC ................ *B24B 39/00* (2013.01); *B23C 3/00* (2013.01); *B23P 9/00* (2013.01); *B23P 9/02* (2013.01);
(Continued)

(58) Field of Classification Search
CPC ........ B24B 39/00; B24B 39/02; B24B 29/005; B23P 9/02; B23C 3/16; B23C 3/34;
(Continued)

(56) References Cited

U.S. PATENT DOCUMENTS 2,486,363 A * 10/1949 Purvis ..................... B23B 51/08
15/105
4,821,545 A 4/1989 Druelle
(Continued)

FOREIGN PATENT DOCUMENTS

CN 101116957 A 2/2008
CN 101795804 A 8/2010
(Continued)

OTHER PUBLICATIONS

JP Notice of Allowance dated Sep. 5, 2016, for JP application No. 2015-523490.
(Continued)

*Primary Examiner* — Daniel Howell
(74) *Attorney, Agent, or Firm* — Beusse Wolter Sanks & Maire

(57) ABSTRACT

A method for machining a material, in particular steel, is provided. The material is milled at such a high cutting speed that residual tensile stresses close the surface that exceed a specified value can occur and the residual tensile stresses can be lowered below the specified value by subsequent brushing. A device for performing the method is also provided.

19 Claims, 4 Drawing Sheets

(51) Int. Cl.
  *B23P 9/00* (2006.01)
  *C21D 7/04* (2006.01)
  *B24B 19/02* (2006.01)
  *C21D 7/08* (2006.01)
  *B23C 3/00* (2006.01)
  *B23P 9/02* (2006.01)

(52) U.S. Cl.
  CPC ............ *B24B 19/02* (2013.01); *B24B 29/005* (2013.01); *C21D 7/04* (2013.01); *C21D 7/08* (2013.01); *B23C 2220/28* (2013.01); *B23C 2220/44* (2013.01); *B23C 2222/32* (2013.01); *Y10T 29/47* (2015.01); *Y10T 409/303808* (2015.01)

(58) Field of Classification Search
  CPC ....... B23C 2220/44; C21D 7/08; Y10T 29/47; Y10T 409/303752; Y10T 409/303808
  USPC .................................. 29/90.01; 409/131–132
  See application file for complete search history.

(56) References Cited

U.S. PATENT DOCUMENTS

| | | | |
|---|---|---|---|
| 5,873,685 A * | 2/1999 | Yagi | B23Q 11/0021 29/26 A |
| 6,676,340 B2 * | 1/2004 | Kress | B08B 1/04 407/1 |
| 7,761,993 B2 | 7/2010 | Chen | |
| 8,511,949 B2 | 8/2013 | Itoh | |
| 8,579,559 B2 | 11/2013 | Nagase | |
| 2008/0005861 A1 | 1/2008 | Niizaki et al. | |
| 2008/0019837 A1 | 1/2008 | Chen | |
| 2008/0223099 A1 | 9/2008 | David | |
| 2010/0135780 A1 | 6/2010 | David | |
| 2011/0014002 A1 * | 1/2011 | Storch | B23C 3/34 409/219 |

FOREIGN PATENT DOCUMENTS

| | | |
|---|---|---|
| CN | 101823165 A | 9/2010 |
| CN | 102089106 A | 6/2011 |
| DE | 19516834 A1 | 11/1996 |
| DE | 102011001754 A1 | 3/2012 |
| EP | 1555329 A1 | 7/2005 |
| EP | 2226151 A1 | 9/2010 |
| EP | 2226151 B1 | 10/2011 |
| JP | 1225721 A | 9/1989 |
| JP | H01225721 A | 9/1989 |
| JP | H06155172 A | 6/1994 |
| JP | H1148112 | 2/1999 |
| JP | 2011020250 A | 2/2011 |
| JP | 2011156624 A | 8/2011 |
| JP | 2011251402 A | 12/2011 |
| SU | 751602 A2 | 7/1980 |
| WO | 2006087292 A1 | 8/2006 |
| WO | 2013125652 A1 | 8/2013 |

OTHER PUBLICATIONS

Thompson Scientific Database WPI, Week 198115, London, AN 1981-D3281D; GB.

* cited by examiner

US 9,919,404 B2

METHOD FOR MACHINING MATERIALS BY MILLING AND SUBSEQUENT BRUSHING

CROSS REFERENCE TO RELATED APPLICATIONS

This application is the US National Stage of International Application No. PCT/EP2013/064902 filed Jul. 15, 2013, and claims the benefit thereof. The International Application claims the benefit of European Application No. EP12178175 filed Jul. 27, 2012. All of the applications are incorporated by reference herein in their entirety.

FIELD OF INVENTION

The invention relates to a method for machining materials by milling and subsequent brushing.

BACKGROUND OF INVENTION

In the context of the background of the invention it is to be noted that in the case of steam turbines the connections between the turbine shaft and the rotor blades belong to the group of most heavily stressed components. Therefore, it is also important for the internal stress state close to the surface after machining to be kept in as non-critical a range as possible. If excessive internal tensile stresses in the region close to the surface are created during machining, said internal tensile stresses by way of heterodyning with the operational stresses may lead to crack initiation. In order to obtain no internal tensile stresses or internal tensile stresses which are as low as possible, fixedly defined machining parameters or milling parameters, respectively, such as, for example, cutting and feed rates, depth of cut, etc. are predetermined. These specifications most often lead to reduced cutting and feed rates and thus to an often significant increase in the machining time.

SUMMARY OF INVENTION

It is an object of the present invention to provide a method by way of which a less complex machining of materials is possible, without having to accept the problems connected with internal tensile stresses. Furthermore, a device by way of which such a method can be carried out is to be provided.

The solution to this object is to be found in particular in the independent patent claims. The dependent patent claims teach advantageous design embodiments. Further details are stated in the following description.

It has been recognized according to the invention that a method for machining materials, in particular steel, is to be provided. Here, milling is performed at such a high cutting rate that internal tensile stresses which may exceed a predetermined value may arise, and in which by way of subsequent brushing the internal tensile stresses which exceed the predetermined value are reduced so as to be below the predetermined value. It has to be initially explained that internal tensile stresses do not necessarily always arise in an undesirable manner in the case of comparatively high cutting rates. However, in the case of high cutting rates undesirable internal tensile stresses arise so frequently that this cannot be accepted. In order to reduce these internal tensile stresses so as to be below a predetermined value it is provided according to the invention that the material is brushed after milling. To this end the insight is required that by way of milling at a comparatively high cutting rate the complexity for milling can be reduced so heavily that the additional complexity for the subsequent brushing can be more than compensated for. This is surprising to the extent that in general tool changing in the case of the machining of materials is dispensed with as far as possible in order to avoid unnecessary complexity.

It is provided in one embodiment of the invention that grooves, for example fir-tree grooves, are milled into turbine shafts or into wheel disks. As has been explained at the outset, turbine shafts are highly stressed components, in particular at the connection of the turbine shafts to the blades which are attached to the turbine shaft. To this end, grooves, often fir-tree grooves, are provided. Fir-tree grooves are clearances in the material, the width of which reduces as the depth of the clearance increases. However, this does not take place in a uniform manner. Rather, the outer sides of the fir-tree grooves are undulated. This results in a profile which is similar to that of a fir tree. A constriction is adjoined by a widening.

Then there is again a constriction which is narrower than the preceding constriction. The widening which now follows again is also narrower than the preceding widening, but wider than the immediately preceding constriction. Components having a corresponding shape can be inserted into such a fir-tree groove and fastened therein in a very stable manner. It is precisely in the milling of fir-tree grooves that undesirable internal tensile stresses may arise. It is very important for the stability of fir-tree grooves that various values of internal tensile stresses are not exceeded in various regions.

Wheel disks are also highly stressed components, such that the method according to the invention is also of particular significance here.

In one embodiment of the method it is achieved that brushing converts the internal tensile stresses into internal compressive stresses. While internal tensile stresses facilitate the formation of cracks and further damage resulting therefrom, internal compressive stresses are even favorable with respect to stability. Internal compressive stresses prevent cracks from being created. It is significant in this context that it suffices for the internal tensile stresses, above all in a region close to the surface, to not exceed predetermined values.

In one embodiment of the method it is provided that brushing takes place by a rotational and/or translational movement of the brushes. Rotating the brushes on a material, that is to say to perform a rotational movement, is quite common in other applications, such as for cleaning surfaces. However, experiments have shown that the reduction of undesirable internal tensile stresses may also be achieved well by translational movements. This takes place above all in that the brushes are moved in a quasi oscillating manner. It is also a factor in the selection of the method for which movement for other reasons tools are anyway available. For instance, if a machining robot which is suited to a speedy translational movement with continuous change of direction is available, then brushes may be fastened thereto, so that brushing can be performed using a translational movement.

In one embodiment of the method a brushing device in which a plurality of brushes are present is employed, such that brushing with the brushing device may be simultaneously carried out at a plurality of points. A significant reduction of the machining time for brushing can be thereby achieved.

In one design embodiment of the mentioned embodiment the brushes are disposed on the brushing device such that a plurality of regions in a fir-tree groove may be simultaneously brushed. As explained above, fir-tree grooves have various regions having various widths. If a brushing device having various brushes is now used, a plurality of regions of the fir-tree groove can be machined in one operation. In this manner, a spindle may be provided, for instance, on which a plurality of brushes are mounted. By way of a rotation of the spindle all brushes mounted thereon are rotated. If a plurality of brushes are now mounted on one spindle, these brushes being adapted to a fir-tree groove, it suffices for the spindle to be guided into the fir-tree groove in order to brush the fir-tree groove. All regions to be brushed are brushed by rotating the spindle. It is to be noted here that not all regions of the fir-tree groove have to be brushed. A combination of rotational and translational movements is also readily conceivable. In this manner, one spindle could be simultaneously rotated and moved to and fro. Machining of a fir-tree groove by way of brushing using a translational movement is simultaneously possible using a plurality of brushes. In this manner, a plurality of brushes may be fastened on one holder. The holder is guided into the fir-tree groove. In the latter, said holder is then moved to and fro in a speedy manner from one side to another.

In a further embodiment of the method the brushes and bristles fastened thereon are optimized with respect to the desired reduction of the internal tensile stresses and to a desired service life of the brushing device, wherein it is considered in the optimization that the reduction of the internal tensile stresses depends on the material of the bristles, the relative position of the bristles, the stiffness of the bristles, and on the internal tensile stresses which are present at the commencement of brushing. It has to be initially illustrated that the respective brushes are constructed such that a plurality of bristles are fastened on the brushes. Two factors have to be considered in the layout and selection of the brushes and bristles. Of course, it has to be initially ensured that the desired reduction of the internal tensile stresses is achieved. It has to be noted at this point that it is indeed important for this to reliably happen. To be specific, should this not happen despite brushing there is a significant risk of damage occuring. This may lead to heavy damage to property or even personal injury, so that often a high level of reliability is demanded here. A further point of view in the selection and optimization of the brushes and bristles is the service life of the brushing device. It is thus a matter of how long the device can be operated before a replacement of the brushes is required. This may lead to a conflict with the objective of the previously mentioned requirement for a reliable reduction of internal tensile stresses. In many cases, a reliable reduction of the internal tensile stresses leads to rapid damage to the bristles, such that the service life is reduced. A certain amount of experimenting is required in the individual case. The insight is important that the reduction of the internal tensile stresses depends above all on the material of the bristles, the relative position of the bristles, the stiffness of the bristles, and on the internal tensile stresses which are present at the commencement of brushing. Despite extensive experiments, it has not been possible to determine a simple proportionality or any other identifiable mathematical correlation. In order to avoid misunderstandings it is submitted that the relative position of the bristles is understood to mean by how much the bristles flex when the brushes are pressed against the material to be machined. This is best comprehensible by means of an example. For instance, if the relative position is 2 mm, this means that the brushes, proceeding from the state in which the bristles bear on the material to be brushed in a quasi anodyne manner, are pushed closer toward the material by another 2 mm. However, the bristles are not shortened by this action. There is, however, certain flexing. Depending also on the stiffness of the bristles, this leads to a certain contact pressure of the bristles on the material to be machined. It is understandable to this extent that the relative position, together with the stiffness of the bristles, influences the reduction of the internal tensile stresses.

In a further embodiment of the method it is provided that brushes having bristles which are composed of or contain one of the following materials are employed: stainless steel, steel, nonferrous metals including for example brass or copper, plastic, plastic having embedded abrasive means, natural bristles. In the case of stainless steel, this may be a stainless steel of the EN standard 1.4301 (X5CrNi18-10). The plastic may be polyester, polyamide, polyethylene, or the like. However, a plurality of other plastics is also conceivable. As submitted above, certain experimentation is required in the individual case in order to find the optimum material. It should be mentioned at this point that for instance the finish of the bristles, which may be undulated, straight or braided, influences the brushing result.

It has also emerged that it is favorable for brushes having bristles from stainless-steel wire to be employed, which bristles have a bristle diameter of about 0.15 mm to about 0.35 mm and tensile strength of about 1500 N/mm$^2$ to about 2400 N/mm$^2$. For example, a tensile strength of about 1800 N/mm$^2$ to about 2100 N/mm$^2$ is considered. The aforementioned values have proven to be meaningful in order to reduce internal tensile stresses in a desired manner in low-alloy tempering steel. There is a wide range of meaningful ratios of bristle length to bristle diameter. In this manner, values of about 30 to 500 have been successful.

It has to be additionally explained in general that besides the already mentioned parameters, the type of integration of the bristles is a factor which determines the result of brushing. It is to be noted here that the bristles emanate from a so-called core wire. Here, the core-wire cross section, for instance a round or square core-wire cross section, may have an influence. It is furthermore to be generally noted that in general the effect of brushing, that is to say the reduction of the internal tensile stresses per time interval, may be boosted by an increase in the stiffness of the bristles, an increase in the relative position, an increase in the population density, that is to say the number of bristles per area, and an increase in the brushing speed. However, reference is to be made to the fact that unsuitable brushing parameters may again also lead to internal tensile stresses in certain regions or damage to the surface. A large bristle diameter is meaningful in order to increase the stiffness of the bristles in the case of a short bristle length. The stiffness of the bristles is also supported by a braided execution of the bristles. However, it should also be noted here that a high stiffness of the bristles places a load on the bristle integration on the core wires, on account of which the service life of the brush is reduced. Furthermore, an excessive relative position and an accompanying high flexural load on the bristles lead to a reduction of the service life. The service life is also reduced by a low population density. Bristle breakage, which may be caused by low flexural strength of the bristle material, also leads to a reduction of the service life of the brush. Plastic deformation of the bristles, for instance on account of low elasticity of the bristles, leads to a reduction of the service life of the brush, as does poor integration of the bristles. As already mentioned, optimization is to be supported by experimentation.

In one embodiment of the method it is provided that the milling takes place using high-speed steel cutting materials or carbide cutting materials. Using such cutting materials, high cutting speeds can be attained. The internal tensile stresses thereby caused can be eliminated again by brushing, as has been described above.

In one embodiment of the method it is possible to operate at a milling feed rate of up to 38 mm/min, for example up to about 13 mm/min. This high milling feed rate may take place using the high-speed cutting materials or carbide cutting materials described above. Carbide cutting materials above all are suited to a milling feed rate of up to 38 mm/min. If about 13 mm/min are sufficient, high-speed steel cutting materials are a good choice.

Also claimed is a brushing device configured for carrying out the method described above.

In one design embodiment this brushing device displays brushes of which the contour is adapted to grooves to be milled. In this manner, the brushes are adapted to the fir-tree grooves to be brushed, as illustrated above, for example.

BRIEF DESCRIPTION OF THE DRAWINGS

Further details of the invention are now described in more detail by means of the schematic drawings, in which.

DETAILED DESCRIPTION OF INVENTION

Figure 1:
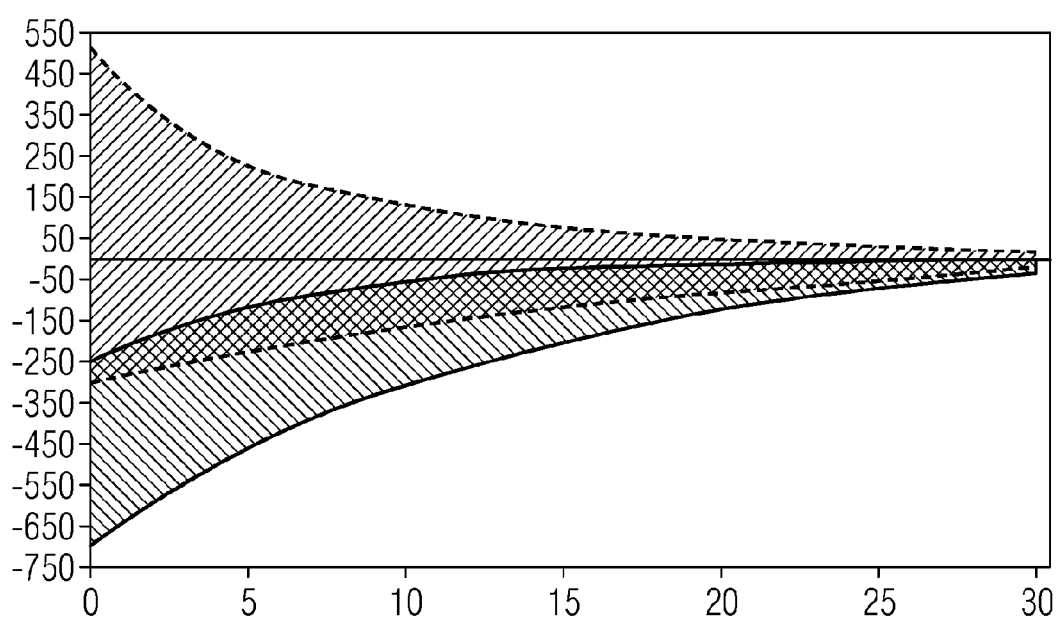
FIG. 1 shows ranges of the profile of internal stress prior to and after brushing.

In FIG. 1 the regions of the profile of internal stress is shown prior to and after brushing. On the right, the depth is indicated in micrometers. The internal stress is indicated on the vertical in MPa. The horizontal line in the center indicates the internal stress at zero. There, neither internal tensile stresses nor internal compressive stresses are thus present. In the ranges above this line, internal tensile stresses are present. In the range below this line, internal compressive stresses are present.

The hatched range on the right, that is to say the range between the two dashed lines, indicates in which ranges the internal stress of a material which is milled at high cutting speed is situated prior to brushing. It can be identified here that undesirable internal tensile stresses are present in many cases. However, there are also cases in which internal compressive stresses exist. The hatched range on the left, that is to say the range between the two solid lines, indicates the values for internal stress after brushing. It can be identified that internal compressive stresses are always present. Internal compressive stresses of this type are desirable since on account thereof the occurrence of cracks is particularly well prevented.

Figure 2:
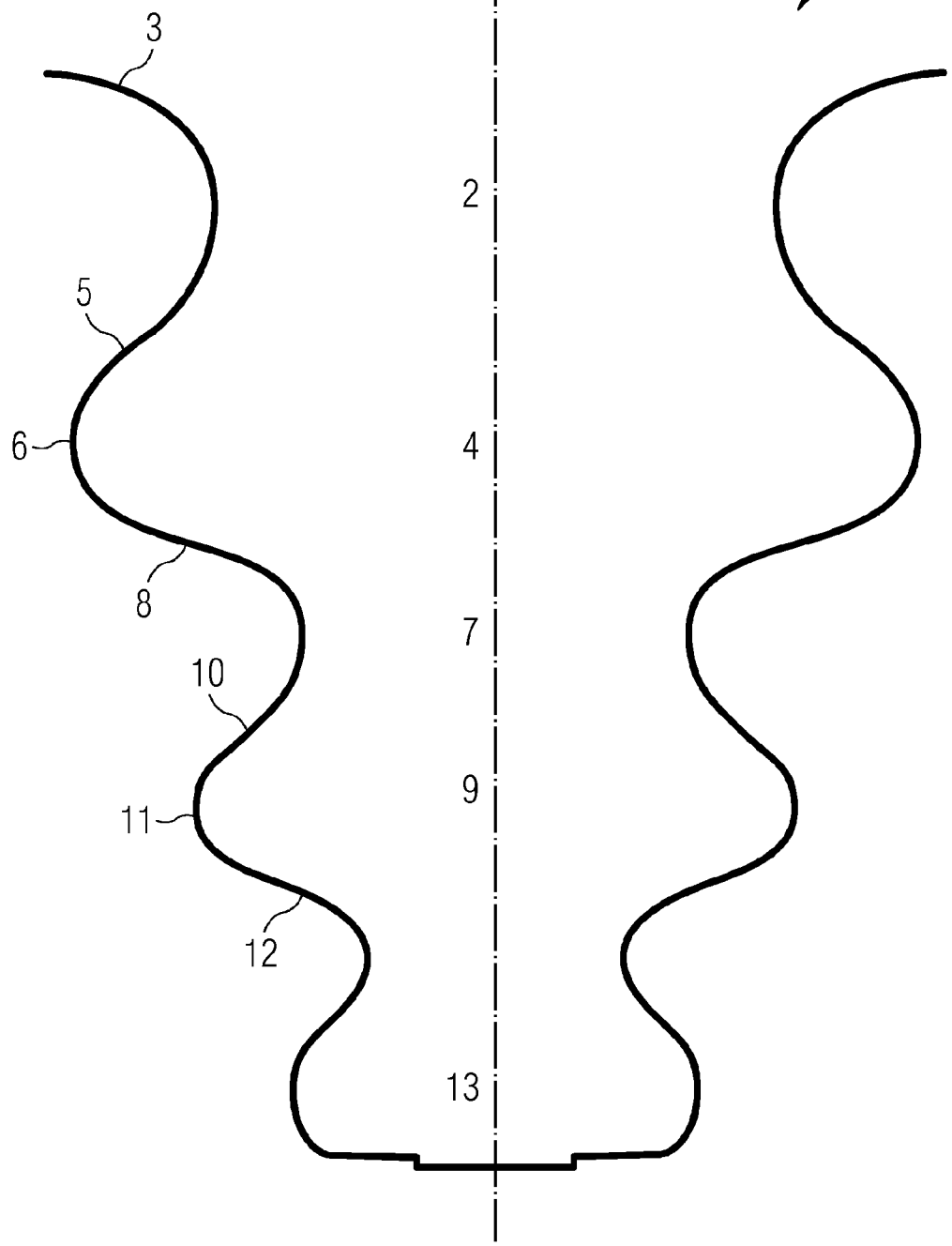
FIG. 2 shows a groove profile of a fir-tree groove and associated requirements of internal tensile stress.

FIG. 2 shows a fir-tree groove 1. A first constricted region 2 can be identified. Said constricted region 2 is bordered by a groove contour 3 which roundly protrudes into the constricted region 2. The groove contour 3 is a result of corresponding milling. Now observing the groove contour 3 at the transition from the constricted region 2 into an upper widened region 4, a first widened region 5 in the material, which is configured as a supporting flank, can be identified. A first outer radial region 6 adjoins the first widened region 5. At the transition to the second constricted region 7 which is narrower than the first constricted region 2, a first constricted region 8 adjoins the outer radial region 6. Now further following the groove contour 3, a widening into a second widened region 9 occurs in the case of the fir-tree groove 1. The second widened region 10, which is a further supporting flank, can be identified in the material.

The second widened region 10 is followed by an outer radial region 11, and the latter is followed by a second constricted region 12. The appearance of a fir-tree groove can thus be identified in more detail. Internal tensile stresses which are as low as possible should be present in the outer radial regions after milling. These requirements do not apply to the inner peripheral regions which are stressed to a lower extent.

Figure 3:
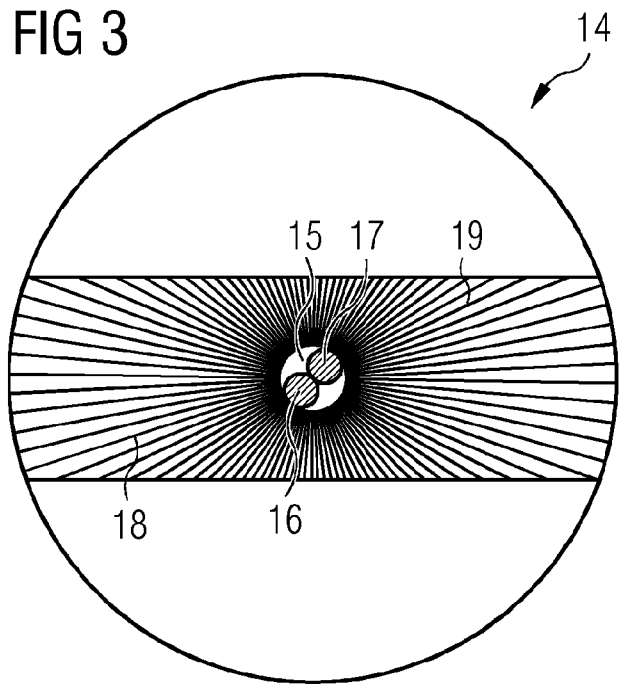
FIG. 3 shows an individual brush in the cross section.

FIG. 3 shows an individual brush 14 in the cross section. A core 15 having two core wires 16 and 17 can be identified. Bristles 18 extend therefrom. The bristles 18 are cut off in segments 19.

Figure 4:
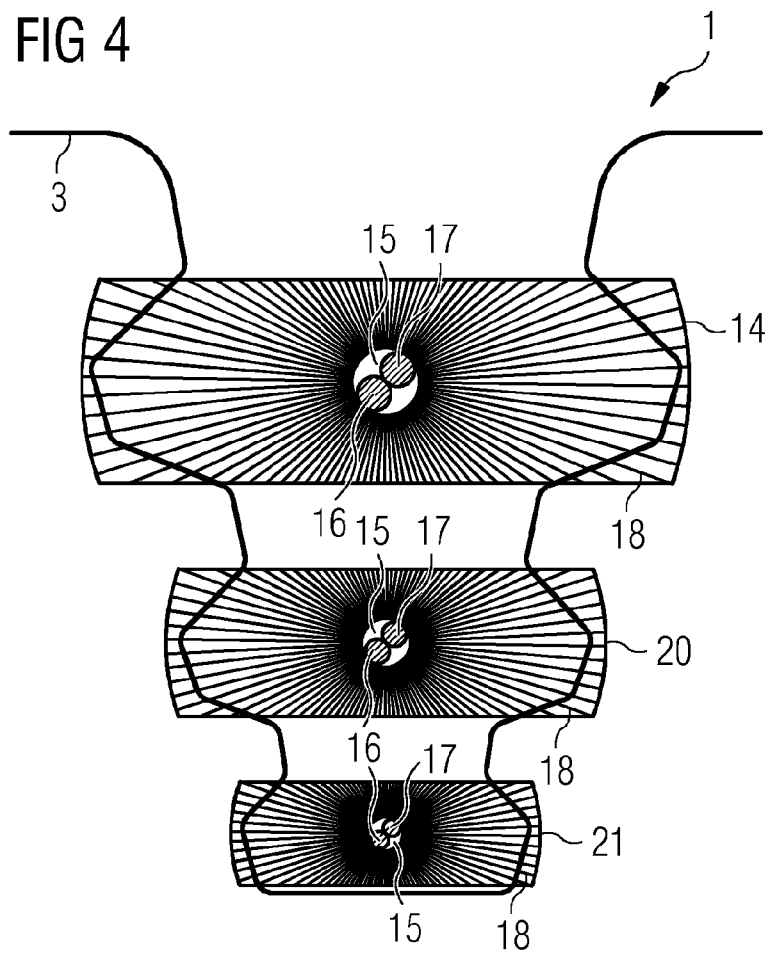
FIG. 4 shows a plurality of brushes of various sizes for brushing a fir-tree groove.

FIG. 4 shows the arrangement of the brushes in the fir-tree groove 1. Here, the brush 14 is illustrated in the first widened region 4, a smaller brush 20 for the second widened region 9 and an even smaller brush 21 for the lower widened region 13. In the interest of clarity, many reference numerals of the fir-tree groove 1 have been omitted here; to this extent reference is made to FIG. 1. Bristles 18 which protrude beyond the groove contour 3 are illustrated. This indeed may not be understood to mean that the bristles 18 would actually protrude into the material. Rather, this is to highlight that the bristles 18, based on their length, would really protrude beyond the groove contour 3. Since the bristles 18 are prevented by the material to be brushed from doing so, the relative position of the bristles 18 which has been further described earlier is invoked.

Figure 5:
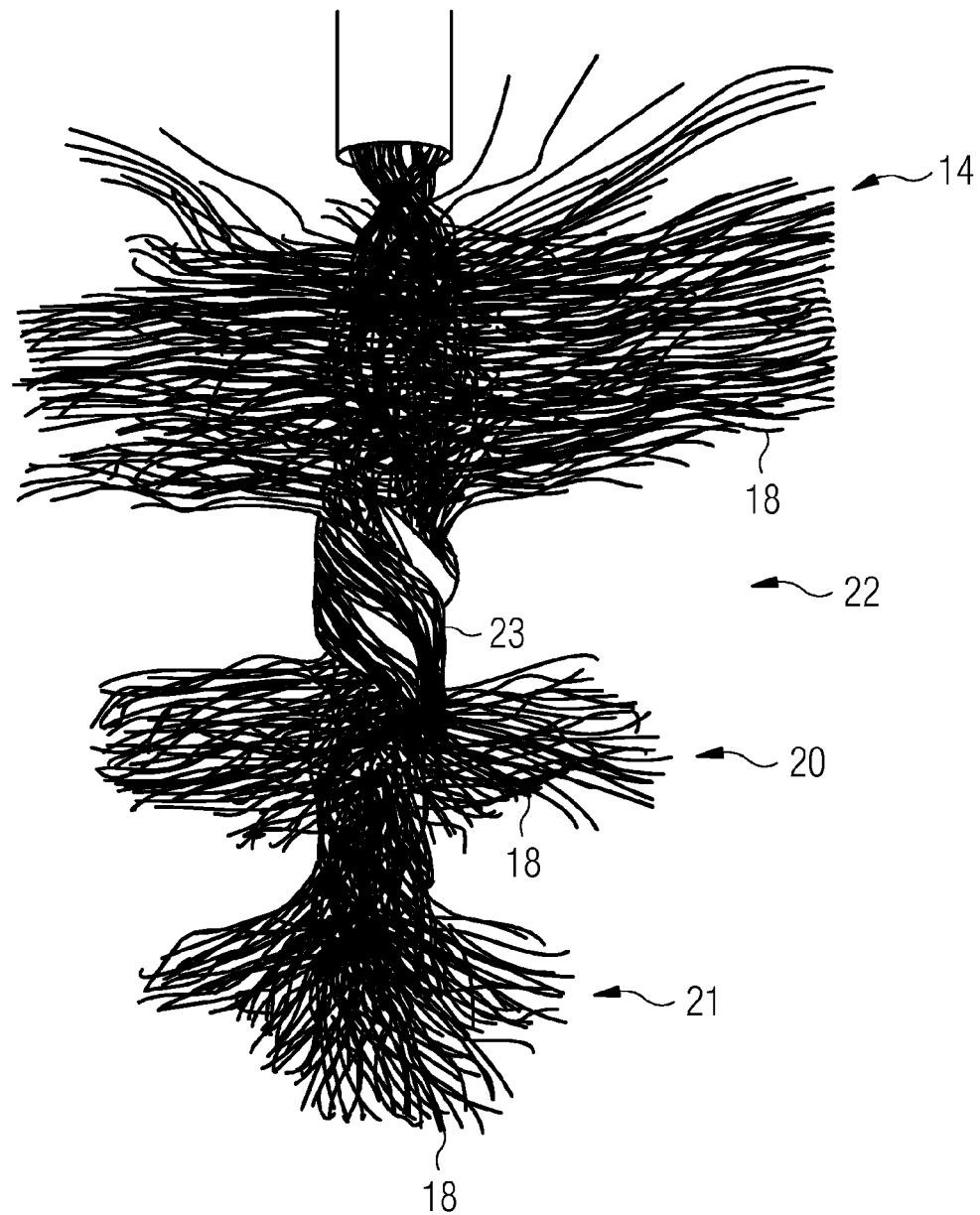
FIG. 5 shows three brushes of various sizes on a common spindle.

FIG. 5 shows a depiction of a brushing device 22. A spindle 23 can be identified. There brushes, namely the larger brush 14, the medium brush 20, and the smaller brush 21, are attached on said spindle 23. Rotation of the spindle 23 results in a rotation of the brushes 14, 20, and 21. On account thereof, rotational brushing may take place.

In an exemplary manner, the fir-tree groove 1 is configured in a face-turned round material from 26NiCrMoV145. In an exemplary manner, the brush is constructed from the bristles 18 from a stainless-steel wire having a diameter of 0.35 mm and a tensile strength of 1.8 to 2.1 kN/mm. The brush is braided, the bristle length being 30 mm. In an exemplary manner, a relative position of 2 mm to 3.5 mm at 150 double strokes and an average brushing speed of 1 m/s is selected for brushing.

For process monitoring, a torque sensor is provided for rotational brushing and a force sensor for translational brushing. As wear of the brush increases, the transmitted torque or force, respectively, decreases. In the case of premature brush wear, a brush replacement can be initiated in this manner. In the event of the wrong brush or no brush having been employed, this type of monitoring also responds.

Although the invention has been illustrated and described in more detail by way of the preferred exemplary embodiment, the invention is not limited by the disclosed examples, and other variations may be derived therefrom by a person skilled in the art, without departing from the scope of protection of the invention.

The invention claimed is:
1. A method for machining a material, comprising:
    milling at a high cutting rate such that internal tensile stresses close to a surface which exceed a predetermined value may arise, subsequent brushing to reduce the internal tensile stresses which exceed the predetermined value so as to be below the predetermined value, and employing a brushing device in which brushes are present, such that brushing with the brushing device may be simultaneously carried out at a plurality of points.

2. The method as claimed in claim 1,
wherein grooves are milled into turbine shafts or into wheel disks.

3. The method as claimed in claim 1,
wherein brushing converts the internal tensile stresses into internal compressive stresses.

4. The method as claimed in claim 1,
wherein brushing is achieved by a translational and/or rotational movement.

5. The method as claimed in claim 1,
wherein the brushes are disposed on the brushing device such that a plurality of regions of a groove may be simultaneously brushed.

6. The method as claimed in claim 1,
wherein the brushes and bristles fastened thereon are optimized with respect to a desired reduction of the internal tensile stresses and to a desired service life of the brushing device,
wherein it is considered in the optimization that a reduction of the internal tensile stresses depends on a material of the bristles, a relative position of the bristles, a stiffness of the bristles, a speed of the bristles, a population density, and on internal tensile stresses which are present at a commencement of brushing.

7. The method as claimed in claim 1,
wherein the brushes comprise bristles that comprise one of the following: stainless steel, steel, nonferrous metals, plastic, plastic comprising embedded abrasive means, and natural bristles.

8. The method as claimed in claim 1,
wherein the brushes comprise bristles that comprise stainless-steel wire, a bristle diameter of 0.15 mm to 0.35 mm, and a tensile strength of 1500 N/mm$^2$ to 2400 N/mm$^2$.

9. The method as claimed in claim 8,
wherein the bristles comprise a ratio of bristle length to bristle diameter of 30 to 500.

10. The method as claimed in claim 1,
wherein the milling takes place using high-speed steel cutting materials or carbide cutting materials.

11. The method as claimed in claim 1,
wherein the milling takes place at a milling feed rate of up to 38 mm/min.

12. A brushing device configured for carrying out a method according to claim 1.

13. The brushing device as claimed in claim 12,
wherein the brushes comprise a contour adapted to grooves to be milled.

14. The method as claimed in claim 1,
wherein the material comprises steel.

15. The method as claimed in claim 2,
wherein the grooves comprise fir-tree grooves.

16. The method as claimed in claim 8,
wherein the tensile strength is 1800 N/mm$^2$ to 2100 N/mm$^2$.

17. The method as claimed in claim 11,
wherein the milling feed rate is up to 13 mm/min.

18. A method for machining a material, comprising:
milling at a high cutting rate such that internal tensile stresses close to a surface which exceed a predetermined value may arise, and subsequent brushing to reduce the internal tensile stresses which exceed the predetermined value to below the predetermined value, wherein brushes comprising bristles comprising stainless-steel wire are employed, which bristles comprise a bristle diameter of 0.15 mm to 0.35 mm and a tensile strength of 1500 N/mm$^2$ to 2400 N/mm$^2$.

19. A method for machining a material, comprising:
milling at a high cutting rate such that internal tensile stresses close to a surface which exceed a predetermined value may arise, and subsequent brushing to reduce the internal tensile stresses which exceed the predetermined value to below the predetermined value, wherein the milling takes place at a milling feed rate of up to 38 mm/min.

* * * * *